Patented Sept. 30, 1941

2,257,163

UNITED STATES PATENT OFFICE 2,257,163

SYNTHETIC RESIN STABLE AGAINST DILUTE ACIDS AND ALKALIES

Paul Esselmann, Wolfen, Kreis Bitterfeld, and Josef Düsing, Dessau, Germany, assignors, by mesne assignments, to Walther H. Duisberg, New York, N. Y.

No Drawing. Application July 13, 1939, Serial No. 284,244. In Germany August 4, 1937

12 Claims. (Cl. 260—79)

This invention relates to the production of new synthetic resin compositions stable against the action of dilute acids and alkalies.

This application is a continuation of part of our prior application Ser. No. 223,011, filed August 4, 1938. In the aforesaid application we have disclosed resins stable against dilute acids and alkalies which are the product of a combined polymerization of an alkyleneimine and arylisocyanates or arylisothiocyanates.

In the United States patent application Ser. No. 182,248 we have disclosed together with Karl Kösslinger that resins insoluble in acids and alkalies are produced by polymerizing alkyleneimine with carbondisulfide. Instead of carbondisulfide, carbonylsulfide, thiophosgene and sulfur chloride may be employed.

It is an object of our present invention to provide a new type of artificial resins which is stable against the action of dilute acids and dilute alkalies.

A further object is the provision of artificial resins having a distinct basic character owing to their content of basic nitrogen.

A further object is the provision of resins which are insoluble in water and the usual organic solvents.

Still another object is the provision of resins which can be easily dyed by the usual acid wool dyestuffs and which, if incorporated in a spinning solution of an organic fiber-forming polymer, lends to the fibers derived from said spinning solution the property of being easily dyed by acid wool dyestuffs.

A further object of the invention is the provision of artificial resins, which may be employed for the production of films, foils, coating compositions, ribbons, bristles, artificial horsehair, fibers, threads, filaments and the like shaped bodies.

Still further objects of our invention will become apparent from the following detailed specification.

We have now found that improved condensation and polymerization products are obtained by jointly polymerizing carbondisulfide or any of the above-named substituents therefor, a cyclic imine and an aromatic isocyanate or an isothiocyanate.

As cyclic imines the following polymerizable imines having a three-membered ring are named as examples: ethylene imine, N-methylethylene imine, N-phenylethylene imine, propylene imine, N-propylethylene imine, N-benzethylene imine, butylene imine, and polymers of these alkylene imines.

As isocyanates phenylisocyanate may be mentioned, further phenylisothiocyanate, benzylisocyanate, naphthylisocyanaate and the corresponding isothiocyanates.

The proportions of the constituents of the resin may vary within wide limits. There should be present at least 5 per cent as the smallest addition of one component and not more than 60 per cent of the single further component, for instance 10 to 50 per cent of carbon disulfide of the weight of the two other resin components may be present.

The polymerization is preferably carried out as follows: carbondisulfide or carbonylsulfide or thiophosgene or sulfur chloride are added drop by drop to a solution of the alkylene imine. The temperature during this reaction should not rise above about 80 to 100° C. since in that case the reaction products are no longer uniform. The preferred temperature is round about 40 to 50° C. The polymerizate obtained from the sulfur compound and the alkylene imine is allowed to stand for a certain period which may be a few hours or a couple of days. This condensation- or polymerization product is then reacted with an arylisocyanate preferably in an amount that the resultant solution is neutral. The solution obtained polymerizes spontaneously by standing for a certain time. However, the polymerization may be accelerated by acid or basic catalysts or by heating. Products of high degree of polymerization are obtained by heating the resin for a longer period after it has been separated from the solution. Alternatively carbondisulfide may be first condensed with phenylisocyanate and then the ethyleneimine added to complete the polymerization.

The resins according to this invention have a distinctly basic character. They are stable against acid and alkaline liquids and absorb acid dyestuffs eagerly. They may be employed in coating compositions, industrial finishes or for the purpose of animalizing fibers (imparting to vegetable or artificial fibers such as cotton and rayon the dyeing properties of animal fibers such as wool and silk).

The following examples serve to illustrate the invention:

Example 1

To a solution of 500 cc. of ethyleneimine (98 per cent strength) in 1000 cc. of benzene there are added by drops at 40° C. 100 cc. of carbon disulfide ($=\frac{1}{5}$ mol calculated on the ethyleneimine). This polymerizate is allowed to stand for 14 days and then 250 cc. of it are allowed to react with so much phenylisocyanate at 40°

C. that the solution is neutral (testing with phenolphthalein). The consumption of phenylisocyanate differs according to the degree of polymerization and may be about 60-100 cc. This animalizing solution is again allowed to stand for 24 hours at room temperature for the purpose of further polymerization. Of this finished solution 150 cc. are added to 5 liters of viscose and the whole is well emulsified. After de-aeration the viscose is spun. The corresponding proportion of animalizing solution may alternatively be added to the spinning solution on its way to the spinning nozzle. The animalized threads have a strong affinity for acid wool dyestuffs, very good fastness to washing and especially good fastness to light in the case of after-chroming dyestuffs.

*Example 2*

To a mixture of 400 cc. of benzene and 100 cc. of carbon disulfide there are added gradually 125 cc. of phenylisocyanate. There are then added cautiously drop by drop at 40° C. in a reflux apparatus 100 cc. of ethyleneimine (98 per cent strength).

The condensation product is allowed to stand for 72 hours for further polymerization. Of this animalizing solution 100 cc. are stirred into 5 liters of viscose, which is then spun. The fibers dyed with wool dyestuffs, for instance metachrome Red 5G, Anthralan Yellow, Supramine Red B, Chrome Yellow A, fast Mordant Blue B, exhibit very good fastness to washing and perspiration. The fastness to light of the fibers is very good, especially in the case of after-chroming and meta-chrome dyestuffs.

*Example 3*

To a solution of 200 cc. of benzene and 100 cc. of ethyleneimine (98 per cent strength) are added at 40° C. through a dropping funnel 100 cc. of carbon disulfide. The solution is allowed to stand for 24 hours and then at 40° C. 125 cc. of phenylisocyanate are added by drops. The resinous polymerizate is left for 24 hours at room temperature for further polymerization. It is soluble in ethylenechlorhydrin and in benzylalcohol. 100 cc. of the animalizing solution dissolved in a little benzyl alcohol are thoroughly emulsified in 5 liters of viscose and the mass is spun in known manner. Finished threads have a strong affinity for acid wool dyestuffs. After dyeing they are thoroughly fast to washing. The fastness to light of the fibers dyed with after-chroming dyestuffs is very good.

*Example 4*

To a solution of 500 cc. of ethyleneimine (98 per cent strength) in 1000 cc. of benzene are added by drops at 40° C., 50 cc. of carbon disulfide. The polymerizate is allowed to stand for 8 days and then caused to react at 40° C. with 400 cc. of phenylisothiocyanate. The resin thus obtained is further polymerized at room temperature for 4 days after 5 cc. of glacial acetic acid have been added. 100 cc. of the finished polymerization product is emulsified in viscose and the mass is spun.

*Example 5*

150 cc. of N-benzylethyleneimine in 300 cc. of benzene are cautiously caused to react at 40° C. with 50 cc. of carbon disulfide. The whole is allowed to stand for 24 hours at room temperature and then at 40° C. and under reflux there are added 60 cc. of α-naphthylisocyanate. The resin solution thus obtained is allowed to stand for 3 days while warm for polymerization and may then be used for animalizing fibers. For example, cotton fabric may be saturated with a benzene solution of the artificial resin, then squeezed calender rollers and dried. If desired, the resin is used in the form of an aqueous emulsion for preparing the fabric.

In the foregoing examples carbon disulfide may be replaced by the above-named sulfur compounds, while ethylene imine may be replaced by any of the above-named alkylene imines, and phenylisocyanate by any of the above-named isocyanates.

We claim:

1. A synthetic resin stable against dilute acids and alkalies said resin being a co-polymerizate of the following three constituents: 1, ethyleneimine, 2, carbondisulfide, and 3, phenylisocyanate.

2. A synthetic resin stable against dilute acids and alkalies, said resin being a co-polymerizate of the following three constituents: 1, about 50 parts of ethyleneimine, 2, about 10 parts of carbon disulfide, and 3, about 40 parts of phenylisocyanate.

3. The process which comprises jointly polymerizing the following three resin components: 1, ethyleneimine, 2, carbondisulfide, and 3, phenylisocyanate by gradually adding the carbon disulfide to only one of the other components while preventing the temperature of the mixture from rising above 100° C., causing the components to react and thereafter adding the third component to the reaction mixture.

4. The process which comprises jointly polymerizing the following three resin components: 1, about 50 parts of ethyleneimine, 2, about 10 parts of carbondisulfide, and 3, about 40 parts of phenylisocyanate by gradually adding the carbon disulfide to only one of the other components while preventing the temperature of the mixture from rising above 100° C., causing the components to react and thereafter adding the third component to the reaction mixture.

5. A synthetic resin stable against dilute acids and alkalies, said resin being a co-polymerizate of the following three constituents: 1, an alkylene imine, 2, carbondisulfide, and 3, a compound selected from the group consisting of arylisocyanates and arylisothiocyanates.

6. The process which comprises jointly polymerizing the following three resin components: 1, an alkylene imine, 2, carbondisulfide, and 3, a compound selected from the group consisting of arylisocyanates and arylisothiocyanates by gradually adding the carbon disulfide to only one of the other components while preventing the temperature of the mixture from rising above 100° C., causing the components to react and thereafter adding the third component to the reaction mixture.

7. A synthetic resin stable against dilute acids and alkalies, said resin being a copolymerizate of the following three constituents: 1, ethyleneimine, 2, carbondisulfide, and 3, a phenylisothiocyanate.

8. A synthetic resin stable against dilute acids and alkalies, said resin being a co-polymerizate of the following three constituents: 1, ethyleneimine, 2, carbondisulfide, and 3, an arylisocyanate.

9. A synthetic resin stable against dilute acids and alkalies, said resin being a co-polymerizate of the following three constituents: 1, ethyleneimine, 2, carbondisulfide, and 3, an arylisothiocyanate.

10. The process which comprises jointly polymerizing the following three resin components: 1, ethyleneimine, 2, carbondisulfide, and 3, a phenylisothiocyanate by gradually adding the carbon disulfide to only one of the other components while preventing the temperature of the mixture from rising above 100° C., causing the components to react and thereafter adding the third component to the reaction mixture.

11. The process which comprises jointly polymerizing the following three resin components: 1, ethyleneimine, 2, carbondisulfide, and 3, an arylisocyanate by gradually adding the carbon disulfide to only one of the other components while preventing the temperature of the mixture from rising above 100° C., causing the components to react and thereafter adding the third component to the reaction mixture.

12. The process which comprises jointly polymerizing the following three resin components: 1, ethyleneimine, 2, carbondisulfide, and 3, an arylisothiocyanate by gradually adding the carbon disulfide to only one of the other components while preventing the temperature of the mixture from rising above 100° C., causing the components to react and thereafter adding the third component to the reaction mixture.

PAUL ESSELMANN.
JOSEF DÜSING.